United States Patent
Subramaniam et al.

(10) Patent No.: US 12,519,694 B2
(45) Date of Patent: Jan. 6, 2026

(54) METHOD AND APPARATUS FOR UPGRADING RADIO ACCESS NETWORK IN A COMMUNICATION SYSTEM

(71) Applicant: SAMSUNG ELECTRONICS CO., LTD., Suwon-si (KR)

(72) Inventors: Karthikeyan Subramaniam, Bangalore (IN); Deepanshu Gautam, Bangalore (IN); Karthikeyan Narayanan, Bangalore (IN); Naveen Kumar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/054,296

(22) Filed: Nov. 10, 2022

(65) Prior Publication Data

US 2023/0075108 A1 Mar. 9, 2023

Related U.S. Application Data

(63) Continuation of application No. PCT/KR2021/005708, filed on May 7, 2021.

(30) Foreign Application Priority Data

May 14, 2020 (IN) .............................. 202041020288
Mar. 12, 2021 (IN) .............................. 202041020288

(51) Int. Cl.
*H04L 41/082* (2022.01)
*H04L 41/0895* (2022.01)
(Continued)

(52) U.S. Cl.
CPC ........ *H04L 41/082* (2013.01); *H04L 41/0895* (2022.05); *H04L 41/145* (2013.01);
(Continued)

(58) Field of Classification Search
CPC . H04L 41/0895; H04L 41/082; H04L 41/342; H04L 41/40; H04L 41/044;
(Continued)

(56) References Cited

U.S. PATENT DOCUMENTS 8,589,541 B2 * 11/2013 Raleigh ............. H04W 52/0212
709/224
10,477,610 B2 11/2019 Wan et al.
(Continued)

FOREIGN PATENT DOCUMENTS

CN 106982129 7/2017
CN 112346755 2/2021
(Continued)

OTHER PUBLICATIONS

Indian Office Action dated Feb. 23, 2023 for Indian Application No. 202041020288.
(Continued)

*Primary Examiner* — Greg C Bengzon
(74) *Attorney, Agent, or Firm* — NIXON & VANDERHYE P.C.

(57) ABSTRACT

A pre-5th-Generation (5G) or 5G communication system for supporting higher data rates Beyond 4th-Generation (4G) communication system such as Long Term Evolution (LTE). Method and/or electronic device for managing a software upgrade of a network element of a radio access network (RAN) by a management data analytics service (MDAS) producer is provided. The method comprises: receiving a request related to an optimal time for the software upgrade of the network element in the RAN, from a MDAS consumer; identifying information related to a dedicated radio bearer (DRB); identifying information related to the optimal time for the software upgrade of the network element based on the information related to the DBR; and transmitting a
(Continued)

report including the information related to the optimal time for the software upgrade of the network element.

20 Claims, 8 Drawing Sheets

(51) Int. Cl.
  *H04L 41/14* (2022.01)
  *H04L 41/147* (2022.01)
  *H04L 41/149* (2022.01)
  *H04L 41/40* (2022.01)
(52) U.S. Cl.
  CPC .......... *H04L 41/147* (2013.01); *H04L 41/149* (2022.05); *H04L 41/40* (2022.05)
(58) Field of Classification Search
  CPC ............. H04L 41/0803; H04L 41/5009; H04L 41/5012; H04L 41/5019; H04L 41/5077; H04L 41/046; H04L 41/0813; H04L 41/0893; H04L 41/145; H04L 41/147; H04L 41/149; H04L 47/70; H04W 24/02; H04W 24/04; H04W 28/0835; H04W 28/12; H04W 28/16; H04W 28/18; H04W 36/06; H04W 36/24; H04W 72/20; H04W 72/29; H04W 84/042; H04W 88/08
  See application file for complete search history.

(56) References Cited

U.S. PATENT DOCUMENTS

| | | | |
|---|---|---|---|
| 10,572,237 B2 | 2/2020 | Mahimkar et al. | |
| 2007/0233698 A1* | 10/2007 | Sundar | H04L 67/34 |
| 2007/0271276 A1* | 11/2007 | Allen | G06N 5/042 |
| 2007/0288791 A1* | 12/2007 | Allen | G06F 11/0793 714/4.11 |
| 2010/0153160 A1* | 6/2010 | Bezemer | G06Q 10/109 705/348 |
| 2011/0173637 A1* | 7/2011 | Brandwine | G06F 9/5072 719/314 |
| 2014/0164622 A1 | 6/2014 | Afshin | |
| 2014/0269269 A1* | 9/2014 | Kovvali | H04W 24/04 370/252 |
| 2015/0169311 A1 | 6/2015 | Dickerson et al. | |
| 2016/0328259 A1 | 11/2016 | Xia et al. | |
| 2017/0187572 A1 | 6/2017 | Wu et al. | |
| 2018/0035307 A1* | 2/2018 | Mahimkar | H04L 43/08 |
| 2018/0165084 A1* | 6/2018 | Mahimkar | G06F 8/65 |
| 2018/0167277 A1* | 6/2018 | Mahimkar | H04L 41/082 |
| 2018/0302303 A1* | 10/2018 | Skovron | G06F 11/34 |
| 2019/0052441 A1* | 2/2019 | Nammi | H04W 64/00 |
| 2019/0081739 A1* | 3/2019 | Nammi | H04L 1/08 |
| 2019/0200244 A1* | 6/2019 | Polepalli | H04W 36/24 |
| 2019/0245741 A1 | 8/2019 | Ni | |
| 2019/0259223 A1 | 8/2019 | Sangameswaran | |
| 2020/0014582 A1 | 1/2020 | Chou et al. | |
| 2020/0014594 A1 | 1/2020 | Lapiotis et al. | |
| 2020/0074412 A1* | 3/2020 | Colena | G06N 5/01 |
| 2020/0100080 A1* | 3/2020 | Mladin | H04W 4/70 |
| 2020/0128604 A1 | 4/2020 | Teyeb et al. | |
| 2020/0221344 A1* | 7/2020 | Jeon | H04W 28/0278 |
| 2020/0326924 A1* | 10/2020 | A | H04L 41/12 |
| 2020/0359244 A1* | 11/2020 | Yao | H04W 24/10 |
| 2021/0084670 A1* | 3/2021 | Chauhan | H04L 65/80 |
| 2021/0135925 A1* | 5/2021 | Mahimkar | G06N 20/00 |
| 2022/0360461 A1* | 11/2022 | Raleigh | H04W 12/06 |
| 2023/0189111 A1* | 6/2023 | Bulakci | H04W 48/18 370/331 |

FOREIGN PATENT DOCUMENTS

| | | |
|---|---|---|
| JP | 2018-180773 | 11/2018 |
| RU | 2 690 201 C1 | 5/2019 |
| WO | 2020/033424 | 2/2020 |

OTHER PUBLICATIONS

Extended European Search Report dated Aug. 17, 2023 for EP Application No. 21804848.6.
Ericsson: "Evaluation of solutions 18 and 27 for Key Issue #7 (assisting BDT policy negotiation)", 3GPP Draft; S2-1812798 WAS11943 ENA Proposed Conclusions on BDT, 3$^{rd}$ Generation Partnership Project (3GPP), Mobile Competence Centre; Nov. 29, 2018; 5 pgs.
Predicting Optimal Time for Software Upgrade Based on Users Calendar and Instant Messaging Activity ED Darl Kuhn; Apr. 20, 2011; 2 pgs.
Samsung: "pCR solution for RAN Node software upgarde", 3GPP Draft; S5-204576, 3rd Generation Partnership Project (3GPP), Mobile Competence Centre ; 650, Route Des Lucioles ; F-06921 Sophia-Antipolis Cedex ; France, vol. SA WG5, No. Online; Sep. 3, 2020; 3pgs.
3rd Generation Partnership Project; Technical Specification Group Services and System Aspects; Management and orchestration; Study on enhancement of Management Data Analytics (MDA) (Release 17), 3GPP Standard; Technical Report; 3GPP TR 28.809, 3rd G; 73pgs; Oct. 28, 2020.
International Search Report for PCT/KR2021/005708 dated Sep. 7, 2021, 3 pages.
Written Opnion of the ISA for PCT/KR2021/005708 dated Sep. 7, 2021, 5 pages.
[Online], 3GPP TSG-SA5 Meeting #131e, "PCR use case RAN Node software upgrade", Oct. 2020, 2 pages.
[Online], 3GPP TSG-SA5 Meeting #132e, "PCR use case RAN Node software upgrade", Aug. 17-Aug. 28, 2020, 3 pages.
3GPP Specification #28.550, Technical Specification Group Services and System Aspects, Management and orchestration, Performance assurance, Mar. 2020, 116 pages.
Office Action for EP Application No. 21804848.6 dated Aug. 5, 2025, 12 pages.
Russian first Office Action dated May 21, 2024 for RU Application No. 2022132569/07.
Russian first Office Action Search Report dated May 7, 2024 for RU Application No. 2022132569/07.

\* cited by examiner

METHOD AND APPARATUS FOR UPGRADING RADIO ACCESS NETWORK IN A COMMUNICATION SYSTEM

CROSS-REFERENCE TO RELATED APPLICATIONS

This application is a PCT-Bypass Continuation of International Application No. PCT/KR2021/005708, filed May 7, 2021, designating the United States, in the Korean Intellectual Property Receiving Office, and claiming priority to IN Patent Application No. 202041020288 (PS), filed May 14, 2020, and to IN Patent Application No. 202041020288 (CS), filed Mar. 12, 2021, the disclosures of which are all hereby incorporated by reference herein in their entireties.

BACKGROUND

Technical Field

Embodiments herein relate to radio access network (RAN) upgrade, and more particularly to methods and apparatuses for upgrading the software of a virtual RAN node of a $5^{th}$ generation (5G) communication network using management data analytics service (MDAS).

Description of Related Art

To meet the demand for wireless data traffic having increased since deployment of 4th generation (4G) communication systems, efforts have been made to develop an improved 5G or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A telecom network element may include a plurality of software blocks. The software blocks need to be periodically upgraded for fixing bug related issues and introducing new features in the telecom network element. A telecom network operator is likely to trigger a software upgrade of a particular software block or a particular telecom network element at night time, which requires manual intervention. The requirement of manual intervention can strain the telecom network operator, as manual intervention requires having dedicated personnel on standby for checking whether the current traffic conditions are apt for triggering the software update. As the software upgrade is likely to interrupt the availability of services, it is necessary to ensure that the traffic is minimal during the software upgrade.

SUMMARY

In-service software upgrades allow the network operator to address software bugs and add new features to the telecom network element without interrupting network availability. Although in-service software upgrades are preferred, application of in-service software upgrades on the telecom network elements require introducing changes to the telecom network elements.

Various example embodiments disclose methods and/or apparatuses for providing a machine learning (ML) model for predicting an optimal timestamp for upgrading the software of virtual network elements of a 5G network based on analysis of parameters pertaining to the traffic conditions of the virtual network elements of the 5G network.

Various example embodiments enable automatic update of the software of the virtual network elements by integrating the ML model with a cloud management system (CMS) such as network functions virtualization management and network orchestration (NFV MANO).

Various example embodiments generate a bearer information analytical report (BIAR), by the ML model, on receiving a request from the NFV MANO to provide the optimal timestamp for upgrading the software of virtual network elements, wherein the request specifies at least one target virtual network element and a reporting interval, wherein the NFV MANO initiates a software upgrade of the at least one target virtual network element, based on the BIAR.

Various example embodiments generate the BIAR report based on traffic data pertaining to different bearer types, wherein the traffic data is collected from at least one target virtual network element in the 5G network.

Various example embodiments provide the BIAR report to the NFV MANO for enabling the NFV MANO to trigger software upgrade of the at least one target virtual network element at the predicted optimal time instant.

Various example embodiments retain contextual information pertaining to bearers connecting at least one user equipment (UE) to at least one target virtual network element, wherein the contextual information is retained for a predefined time period and verified after the upgrade is completed.

According to an example embodiment, a method for managing a software upgrade of a network element of a radio access network (RAN) by a management data analytics service (MDAS) producer is provided. The method may comprise receiving a request related to an optimal time for the software upgrade of the network element in the RAN, from a MDAS consumer. The method may comprise identifying information related to a dedicated radio bearer (DRB). The method may comprise identifying information related to the optimal time for the software upgrade of the network element based on the information related to the DBR. The method may comprise transmitting a report including the information related to the optimal time for the software upgrade of the network element.

According to an example embodiment, an electronic device of a management data analytics service (MDAS) producer for managing a software upgrade of a network element of a radio access network (RAN) is provided. The electronic device may comprise a memory, and at least one processor coupled to the memory. The at least one processor may be configured to receive a request related to an optimal time for the software upgrade of the network element in the RAN. The at least one processor may be configured to identify information related to a dedicated radio bearer (DRB). The at least one processor may be configured to identify information related to the optimal time for the software upgrade of the network element based on the information related to the DBR. The at least one processor may be configured to transmit a report including the information related to the optimal time for the software upgrade of the network element.

According to an example embodiment, a non-transitory computer readable storage medium storing program code which, when executed by at least one processor of an electronic device of (MDAS) producer for managing a software upgrade of a network element of a radio access network (RAN), causes the electronic device to perform operations is provided. The operations may comprise receiving a request related to an optimal time for the software upgrade of the network element in the RAN, from a MDAS consumer. The operations may comprise identifying information related to a dedicated radio bearer (DRB). The operations may comprise identifying information related to the optimal time for the software upgrade of the network element based on the information related to the DBR. The operations may comprise transmitting a report including the information related to the optimal time for the software upgrade of the network element.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWING

The above and other aspects, features, and advantages of certain example embodiments will be more apparent from the following detailed description, taken in conjunction with the accompanying drawings, in which.

DETAILED DESCRIPTION

Example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The 5G RAN architecture is split into two functional units, viz., a distributed unit (DU) and a central unit (CU). There is also control plane (CP) and a user plane (UP) separation of the CU. Therefore, the CU comprises CU-CP and CU-UP.

Figure 1:
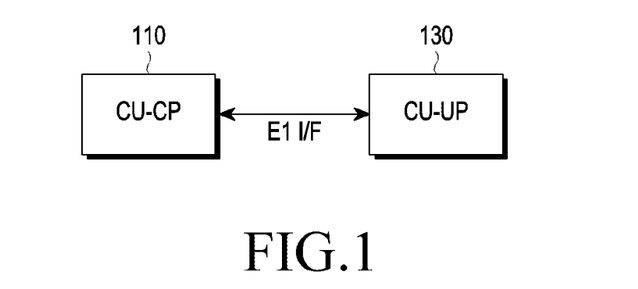
FIG. 1 depicts interfacing of central unit-control plane (CU-CP) and central unit-user plane (CU-UP) for an example embodiment.

FIG. 1 depicts interfacing of CU-CP and CU-UP for an example embodiment.

As depicted in FIG. 1, the CU-CP (110) and CU-UP (130) can be connected, directly or indirectly, to each other using a point-to-point link using an E-1 interface. The E-1 interface separates the radio network layer from the transport network layer. The E-1 interface supports exchanging of information between the CU-CP (110) and the CU-UP (130). The information can be user equipment (UE) related or non-UE related information.

Figure 2:
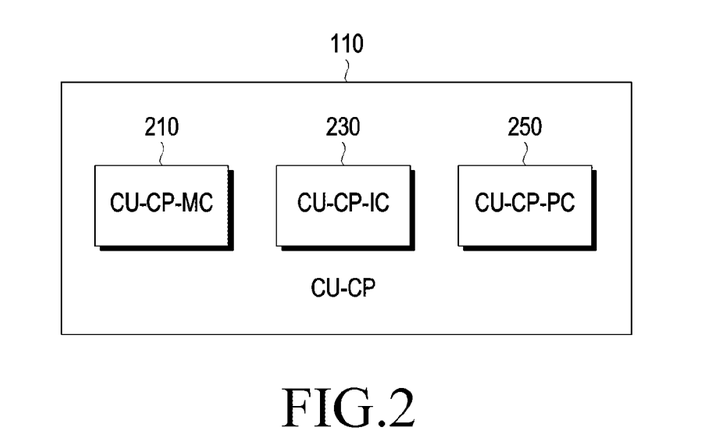
FIG. 2 depicts the various components of the CU-CP for an example embodiment.

FIG. 2 depicts the various components of the CU-CP for an example embodiment.

As depicted in FIG. 2, the CU-CP (110) comprises of three components, viz., a CU-CP management component (CU-CP-MC) (210), a CU-CP interface component (CU-CP-IC) (230), and a CU-CP processing component (CU-CP-PC) (250). The CU-CP-MC (210) comprises of all configurable databases and operational databases. The CU-CP-MC (210) can further include performance data and fault-related data. The CU-CP-IC (230) can be configured to manage interfaces connected to external components and the CU-CP-PC(s) (250). The CU-CP-PC (250) can be configured to process and fulfil all control-plane related requests, e.g. handle all RRC related requests.

Figure 3:
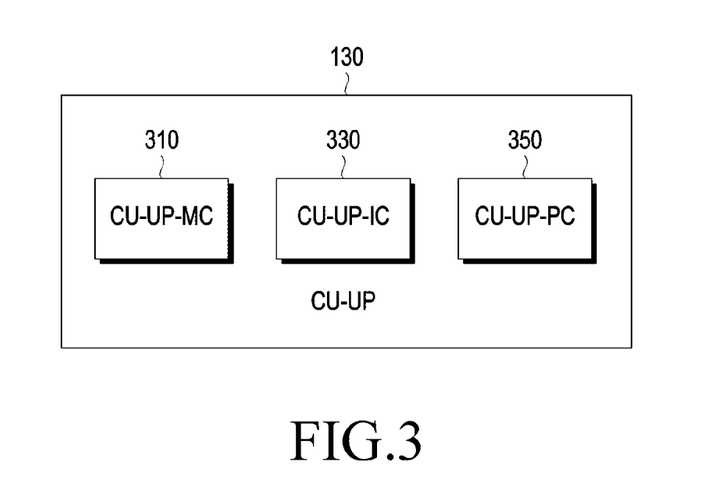
FIG. 3 depicts the various components of the CU-UP for an example embodiment.

FIG. 3 depicts the various components of the CU-UP for an example embodiment.

As shown in FIG. 3, the CU-UP (130) comprises at least three components, viz., a CU-UP management component (CU-UP-MC) (310), a CU-UP interface component (CU-UP-IC) (330), and a CU-UP processing component (CU-CP-PC) (350). The CU-UP-MC (310) comprises of all configurable databases and operational databases. The CU-UP-MC (310) can further include performance data and fault-related data for a particular CU-UP. The CU-UP-IC (330) can be configured to manage interfaces connected to external components and the CU-UP-PC(s). The CU-UP-PC (350) can be configured to process and fulfil all user-plane related requests such as UE and DRB related processing.

The CU-CP (110) is shut down manually to undergo critical maintenance for a very short duration of time. The CU-CP software upgrade can be a critical maintenance scenario. Currently, during the software upgrade procedure, the CU-CP (110) causes all bearers associated with the UEs to be released. The resources that are managed by the CU-CP (110) (which is shut down) for bearer functions, security functions, mobility management functions, and so on, need to be purged during the software upgrade procedure. The CU-CP (110) sends an E-1 reset message to the CU-UP (130). On receiving the E-1 reset message, the CU-UP (130) releases all the UEs and the associated dedicated radio bearers (DRBs). The DRBs are reconfigured at another CU-CP (standby CU-CP). The CU-CP (110) attaches the UEs with the standby CU-CP (considered active during the software upgrade procedure).

The DRBs are reconfigured again when the former CU-CP comes up (now upgraded). The upgraded CU-UP can reattach the DRBs with the UEs during the reattachment procedure at the CU-CP (110). This results in the reestablishment of all the DRBs. The release and (re)attachment of the DRBs leads to significant service impact (in terms of service disruption) and operational impact (in terms of operational expenses).

The CU in a 5G RAN Node system can be a virtualized RAN Node-CU, which is installed in the market data centre (MDC) or edge data centre (EDC). The RAN Node-CU can process the functionalities of radio resource control (RRC) and packet data convergence protocol (PDCP) layers. The virtualization of the CU improves the scalability of 5G system and eases the operation of the CU. The virtualization can be implemented virtualization technology on a network function virtualization (NFV) platform.

Figure 4:
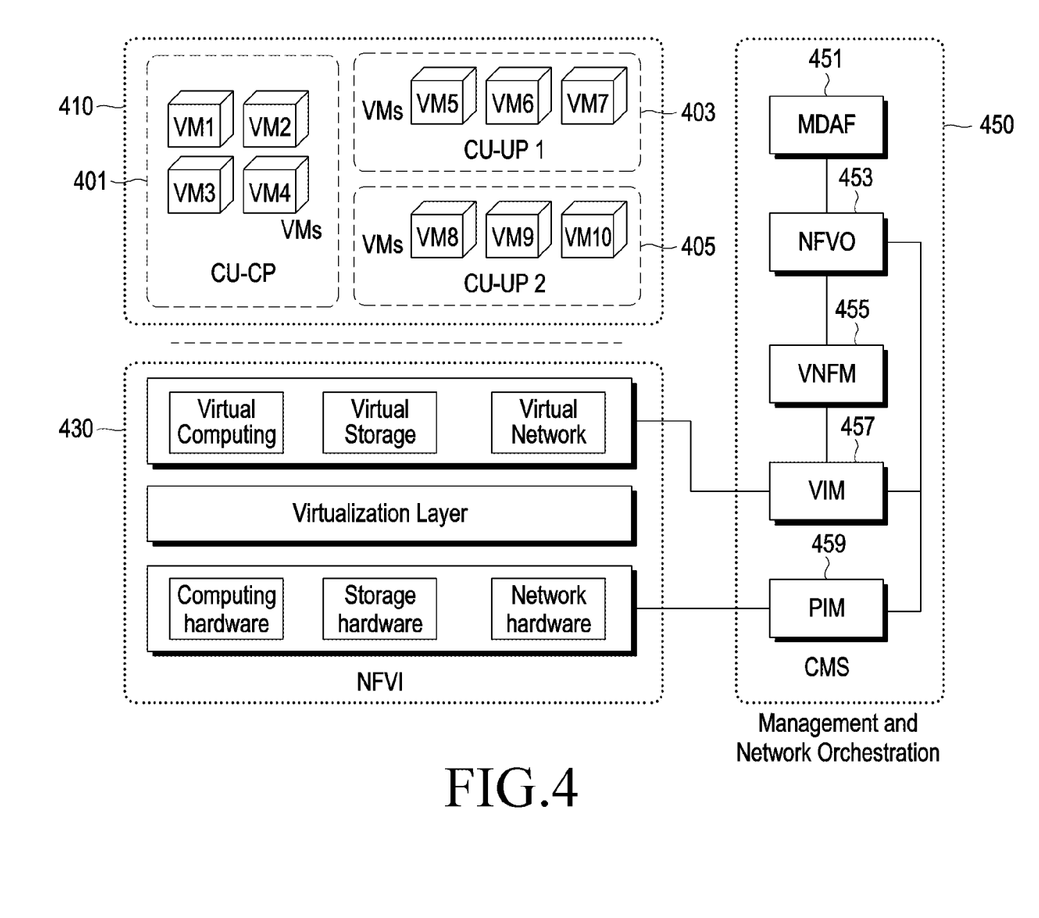
FIG. 4 depicts components of a network functions virtualization (NFV) framework, which virtualizes network functions of a 5G radio access network (RAN) node for an example embodiment.

FIG. 4 depicts components of a NFV framework which virtualizes network functions of a 5G RAN node for an example embodiment.

As depicted in FIG. 4, the NFV framework comprises of a management and network orchestration (MANO) (450), virtualized network functions (VNFs) (410) and NFV infrastructure (NFVI) (430). The CU-CP (401) and CU-UP (403, 405) can be implemented as VNFs (410), which can be scaled independently based on traffic volume. The CU-CP (401) can process signalling messages of the RRC and PDCP-C(PDCP-Control). The CU-UP (403, 405) can process packet data pertaining to GPRS (general packet radio service) tunnelling protocol (GTP) and packet data pertaining to PDCP.

The VNFs (410) can run on Virtual Machines (VMs), and perform specific networking functions of 5G RAN CU and 5G RAN DU nodes. Therefore, the VNFs (410) can be considered as the virtual RAN CU node. In an example, consider that the VNFs (410) performing the networking functions of CU-CP (401) are running on VM-1, VM-2, VM-3, and VM-4. Consider that the CU-UP is split into CU-UP1 (403) and CU-UP2 (405). The VNFs (410) performing the networking functions of CU-UP1 (403) are running on VM-5, VM-6, and VM-7. The VNFs (410) performing the networking functions of CU-UP2 (405) are running on VM-8, VM-9, and VM-10. The networking functions of the CU-CP (401) and CU-UP (403, 405) are installed by loading the VNFs (410) performing specific networking functions on the VMs. Therefore, VNFs (410) corresponding to the networking functions of the CU-CP (401) are upgraded during CU-CP software upgrade.

The MANO (450) may include a management data analytics function (MDAF) (451), a NFV orchestrator (NFVO) (453), a virtualized network function manager (VNFM) (455), a virtualized infrastructure manager (VIM) (457) and a physical infrastructure manager (PIM) (459). A virtualized system manager (VSM) provides management functions for operating and maintaining the RAN Node-CU and the RAN Node-DU. In addition, the VSM provides a north interface for interoperation of operations support systems (OSS). The VSM interacts with the VNFM (455), which is responsible for managing VNF software management functions such as VNF loading and VNF upgrade. The VIM (457) can manage the virtual resources of the NFVI (430), e.g., the virtual computing, virtual storage, and virtual network. The PIM (459) can manage the hardware resources of the NFVI (430), e.g., the computing hardware, storage hardware, and network hardware.

Figure 5:
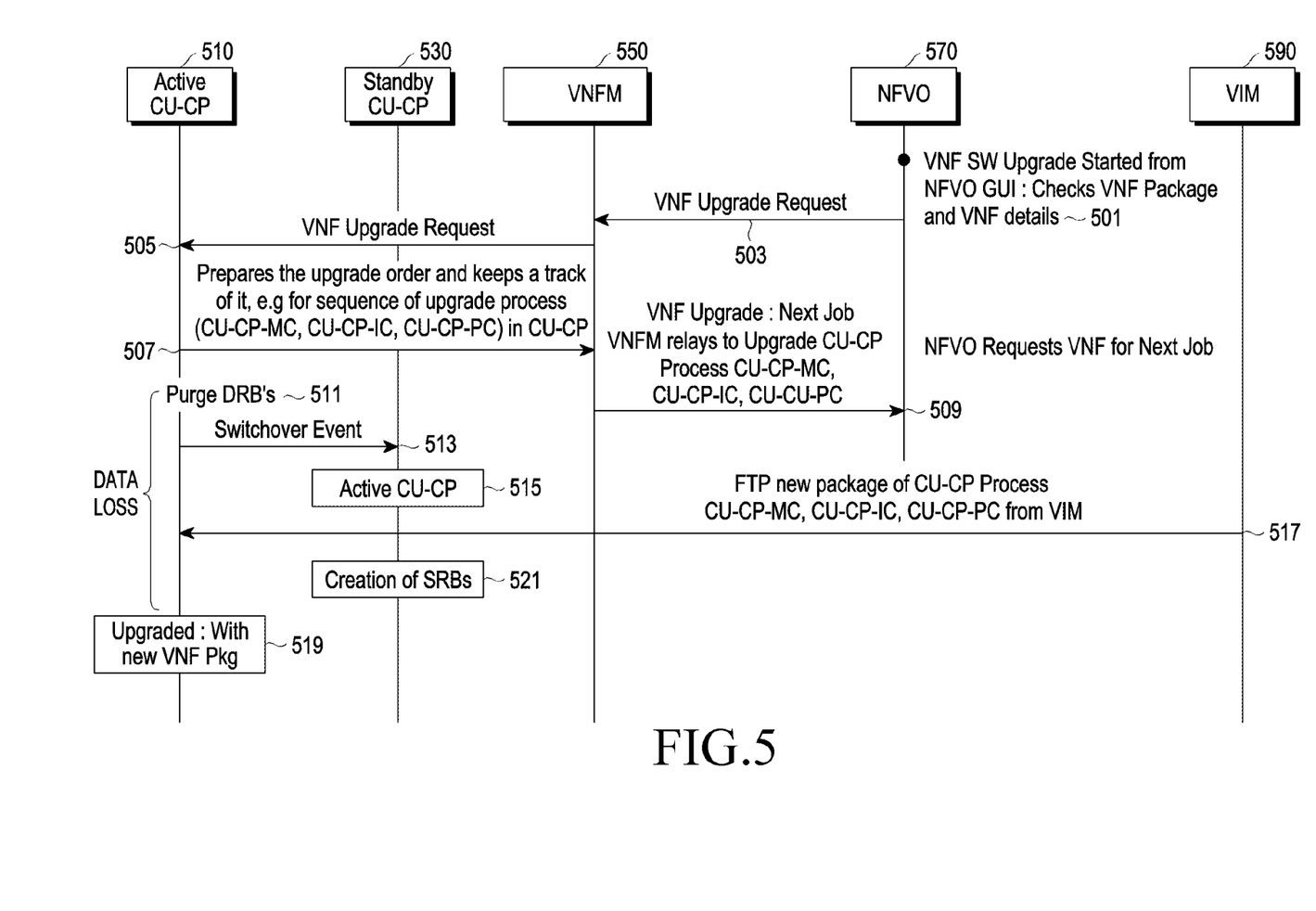
FIG. 5 is a sequence diagram depicting an existing CU-CP upgrade mechanism for an example embodiment.

FIG. 5 is a sequence diagram depicting an existing CU-CP upgrade mechanism for an example embodiment. As depicted in FIG. 5, the Active CU-CP (510) is the CU-CP that needs to be upgraded. The UEs are connected to the Active CU-CP (510) through DRBs. As the CU-CP is a virtualized RAN-CU node, the VIM (590) is involved in the software upgrade of the CU-CP. When the Active CU-CP (510) is upgraded, the UEs can be connected to a Standby CU-CP (530). Once the UEs are connected to the Standby CU-CP (530), the Standby CU-CP (530) becomes an Active CU-CP (510). The software upgrade procedure can be triggered by the NFVO (570). The NFVO graphical user interface (NFVO GUI) can check the package details of the VNFs functioning as CU-CP (performing networking functions of CU-CP). The VNFs that are functioning as CU-CP can be considered to be the Active CU-CP (510).

If the NFVO (570) determines that the CU-CP needs to be upgraded at step 501, the NFVO (570) can send a VNF upgrade request to the VNFM (550) at step 503. As the VNFM (550) manages the VNF software management functions, the VNFM (550) can forward the VNF upgrade request to the Active CU-CP (510) at step 505. The Active CU-CP (510) can generate the upgrade order and track the upgrade order. The upgrade order is the sequence in which the different components of the CU-CP need to be updated. In an example, the update sequence can be CU-CP-MC, which is followed by CU-CP-IC, which is further followed by CU-CP-PC.

The Active CU-CP (510) can send the upgrade order to the VNFM (550) at step 507. The VNFM (550) can relay the Active CU-CP upgrade order to the NFVO (570) at step 509. The Active CU-CP upgrade is initiated after the Active CU-CP (510) sends the upgrade order to the VNFM (550). The UEs attached to the Active CU-CP (510) are released and the DRBs connecting the UEs to the Active CU-CP (510) are purged at step 511. As the DRBs are purged, there is an occurrence of a switchover event at step 513, wherein the UEs are connected to the Standby CU-CP (530) at step 515. The VIM (590) can send the new VNF packages, for the upgrading of the CU-CP-MC, the CU-CP-IC, and the CU-CP-PC, to the Active CU-CP (510), through file transfer protocol (FTP) at step 517.

The DRBs are reconfigured at the Standby CU-CP (530), which becomes the Active CU-CP (510) throughout the software upgrade procedure at step 519. The DRBs can be reconfigured again with the former (previously Active) CU-CP when the former (previously Active) CU-CP is upgraded with the new VNF packages. The upgraded (previously Active) CU-UP can reattach the DRBs with the UEs during the reattachment procedure at the upgraded CU-CP.

The CU-CP update leads to data loss and operational losses as the DRBs need to be reconfigured at the Standby CU-CP (530) and reattached to the Active CU-CP (510) (after upgrade). And the Standby CP-CP (530) can creation of SRBs at step 521. Embodiments herein disclose methods and apparatuses for upgrading the software of virtual network elements of a 5G virtual radio access network (RAN) using management data analytics service (MDAS). The software upgrade is performed at an optimal timestamp within an optimal time window, wherein the optimal timestamp is predicted based on analysis of parameters pertaining to the traffic conditions of the virtual network elements. Example embodiments may include generating, using a machine learning (ML) model, a bearer information analytical report (BIAR), on receiving a request, from a network functions virtualization management and network orchestration (NFV MANO), to provide the optimal timestamp for upgrading the software of virtual network elements. The predicted optimal timestamp is included in the BIAR and provided to the NFV MANO.

The NFV MANO can determine whether the optimal timestamp, which is predicted based on the parameters pertaining to the traffic conditions of the virtual network elements, is suitable for triggering the software upgrade of the virtual network elements. The indication is based on conditions, which can be determined based on the BIAR. The NFV MANO initiates a software upgrade of the virtual network elements at the optimal timestamp, included in the BIAR, which is determined to be suitable based on the conditions.

The virtual network elements can retain contextual information pertaining to bearers, which connect at least one user equipment (UE) to the virtual network elements, prior to the initiation of software upgrade. The virtual network elements can retain the contextual information for a predefined time period. The virtual network elements verify the bearers after the software upgrade has been successfully completed.

Referring now to the drawings, and more particularly to FIGS. 6 through 10, where similar reference characters denote corresponding features consistently throughout the figures, there are shown various example embodiments. Each embodiment herein may be used in combination with any other embodiment described herein.

Figure 6:
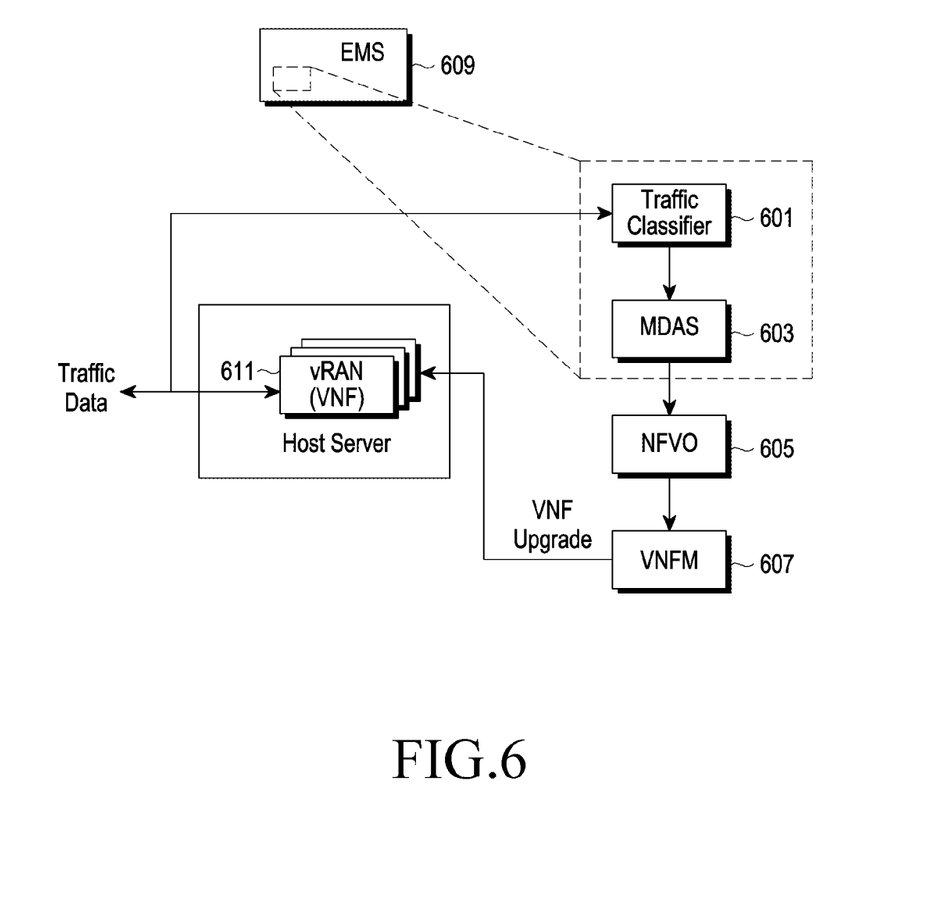
FIG. 6 is a block diagram depicting a process involved in upgrading network functionality software of a virtual RAN of a 5G network, according to various example embodiments.

FIG. 6 is a block diagram depicting a process involved in upgrading network functionality software of a virtual RAN of a 5G network, according to embodiments as disclosed herein. The embodiments can upgrade the network functionality software of a particular virtual network element of the 5G virtual RAN. In an embodiment, network functionality software of virtual network elements of a 4$^{th}$ generation (4G) network or a 6$^{th}$ generation (6G) network can be upgraded using the said process.

For example, if the virtual network element to be upgraded is the CU-CP, then the CU-CP functionality software can be upgraded. In an embodiment, the software upgrade can be performed based on parameters pertaining to data traffic in the 5G network. The software upgrade procedure can be assisted by a MDAS (603), which is a component of the NFV MANO. The MDAS (603) can be requested to perform the software upgrade by a NFVO (605), which is also a component of the NFV MANO. The MDAS (603) can provide a predicted schedule to the NFVO (605) for initiating the software upgrade of a virtual network element in the 5G virtual RAN (611).

In an embodiment, the software upgrade procedure is assisted by a traffic classifier (601) and the MDAS (603). In an embodiment, the traffic classifier (601) and the MDAS (603) can be a part of an element management system (EMS) (609). The traffic classifier (601) collects data pertaining to the traffic conditions in the 5G virtual RAN (611). The data can be parameters related to handover, bearer conditions, bearer types, error recovery, and so on. Based on the data collected by the traffic classifier (601), the MDAS (603) can determine whether a current time instant is suitable for performing the software upgrade. The MDAS (603) can also predict a suitable future time instant for performing the software upgrade of the network element of the 5G virtual RAN (611).

The MDAS (603) can send the suitable future time instant for performing the software upgrade of the network element of the 5G virtual RAN (611) to the NFVO (605). The MDAS (603) can collaborate with the NFVO (605) for validating whether the software upgrade needs to be performed at suitable future time instant. The accuracy of the prediction of the suitable future time instant for performing the software upgrade can be improved through the collaboration. If the NFVO (605) indents to initiate the software upgrade procedure, the NFVO (605) can send a VNF upgrade request to the VNFM (607). The VNFM (607) can forward the upgrade request to the 5G virtual RAN (611) or the network element of the 5G virtual RAN (611) that needs to be upgraded.

The network element of the 5G virtual RAN (611) can initiate the software update. Example embodiments may include preserving the status or context of the bearers connecting the UEs with the network element of the 5G virtual RAN (611). The network element of the 5G virtual RAN (611) can be loaded with a new VNF package. The bearers can be validated by the network element of the 5G virtual RAN (611) to ensure that the software upgrade has been successful.

Figure 7:
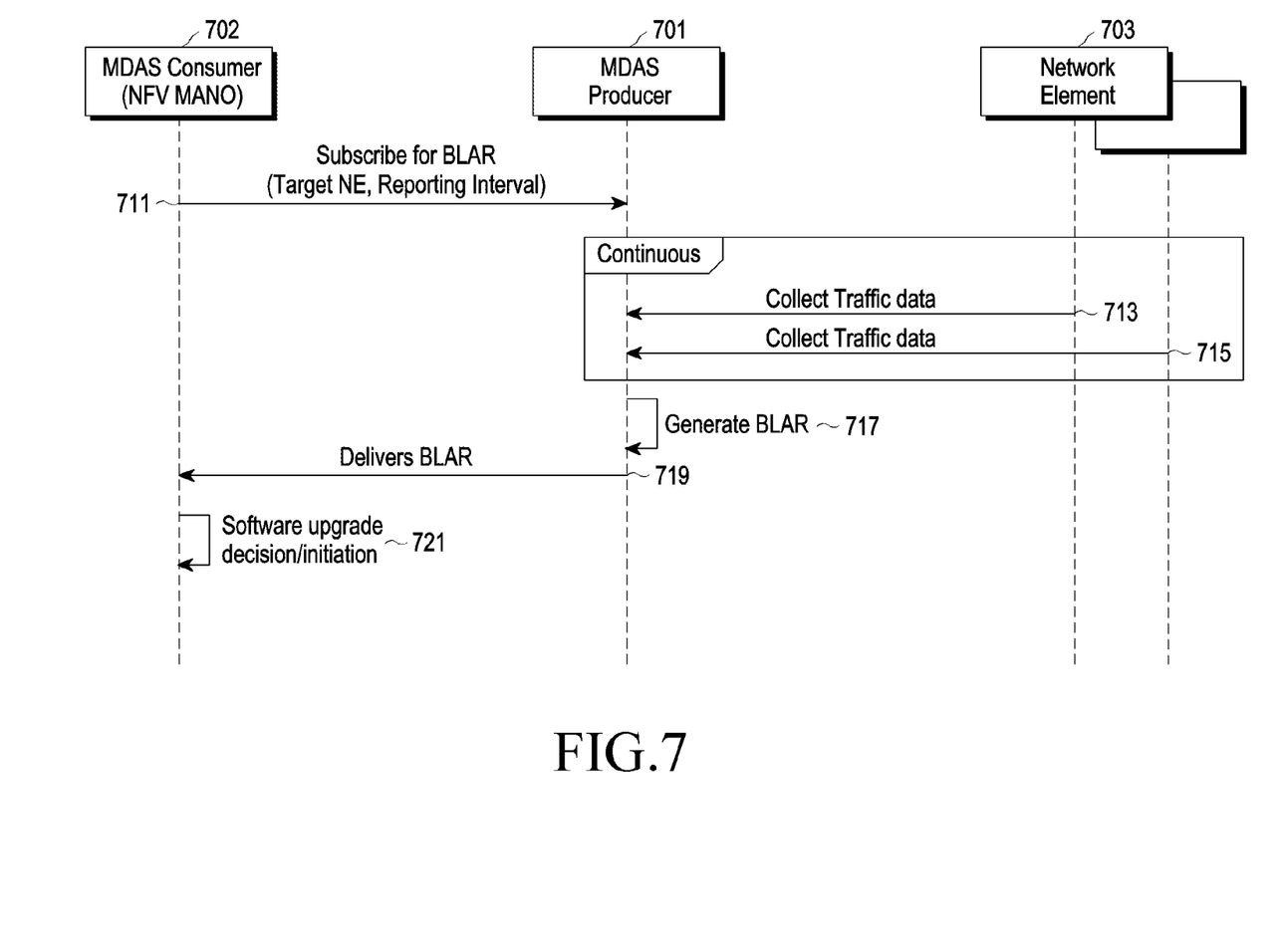
FIG. 7 is a sequence diagram depicting the flow of information involved in automatic upgrade of network functionality software of a network element of a 5G virtual RAN, according to various example embodiments.

FIG. 7 is a sequence diagram depicting the flow of information involved in automatic upgrade of network functionality software of a network element of a 5G virtual RAN, according to embodiments as disclosed herein.

In an example, the network element 703 of the 5G virtual RAN to be updated is the CU-CP. The part of the network element 703, in which the network element 703 is located, can be a next generation Node B (gNB). The network functionality software upgrade of the CU-CP can be triggered automatically. In an embodiment, a MDAS consumer 702 can subscribe for a bearer info analytics report (BIAR) from a MDAS producer 701, which may comprise circuitry, at step 711. The MDAS consumer 702 can be a NFV MANO (NFVO of the NFV MANO), and may comprise circuitry. The MDAS producer 701 is the MDAS (see FIG. 6), which is provided by a management data analytics function (MDAF) located in the EMS.

The BIAR can include parameters that allow the MDAS consumer 702 to determine whether the software upgrade needs to be initiated at a future timestamp. The future time instant is predicted by the MDAS producer 701 and included in the BIAR. The BIAR can be generated by the MDAS producer 701 based on data collected from target gNBs. In an embodiment, the data can include traffic parameters pertaining to the traffic conditions of the target gNBs.

In an embodiment, the MDAS consumer 702 can request the MDAS producer 701 to provide an optimal timestamp at which the software upgrade procedure needs to be triggered such that the impact of the software upgrade procedure on operator and user experience is low. The request can include an optimal time window and at least one target gNB. The reporting interval can indicate to the MDAS producer 701 that the MDAS consumer 702 is expecting the MDAS producer 701 to indicate the optimal timestamp for triggering the software upgrade of the at least one virtual network element 703 within the optimal time window. The at least one target gNB can indicate to the MDAS producer 701 that the MDAS consumer is expecting the MDAS producer 701 to analyze the traffic conditions of the specific at least one gNB and indicate the optimal timestamp for triggering the software upgrade of the at least one virtual network element 703 of the at least one target gNB.

The MDAS producer 701, which may comprise circuitry, can collect data pertaining to the traffic conditions of the at least one target gNB at step 713 and 715. The data may include parameters related to quality of service (QoS), bearers, mobility, error recovery, and so on. The MDAS producer 701 can generate the BIAR based on the collected data pertaining to the traffic conditions of the at least one target gNB at step 717. The BIAR can include a plurality of parameters, including a predicted future timestamp instant which is optimal for performing the software upgrade of the at least one virtual network element 703.

Once the BIAR is generated by the MDAS producer 701, the BIAR is delivered to the MDAS consumer 702 at step 719. The MDAS consumer 702 decides whether to trigger the software upgrade of the at least one virtual network element 703 of the at least one target gNB based on the BIAR at step 721. The MDAS consumer 702 can observe the plurality of parameters included in the BIAR and decide whether to initiate the software upgrade procedure. The MDAS consumer 702 can also collaborate with the MDAS producer 701 to improve the accuracy of the prediction of the future time instant which is suitable for performing the software upgrade of the at least one virtual network element 703 of the at least one target gNB.

Figure 8:
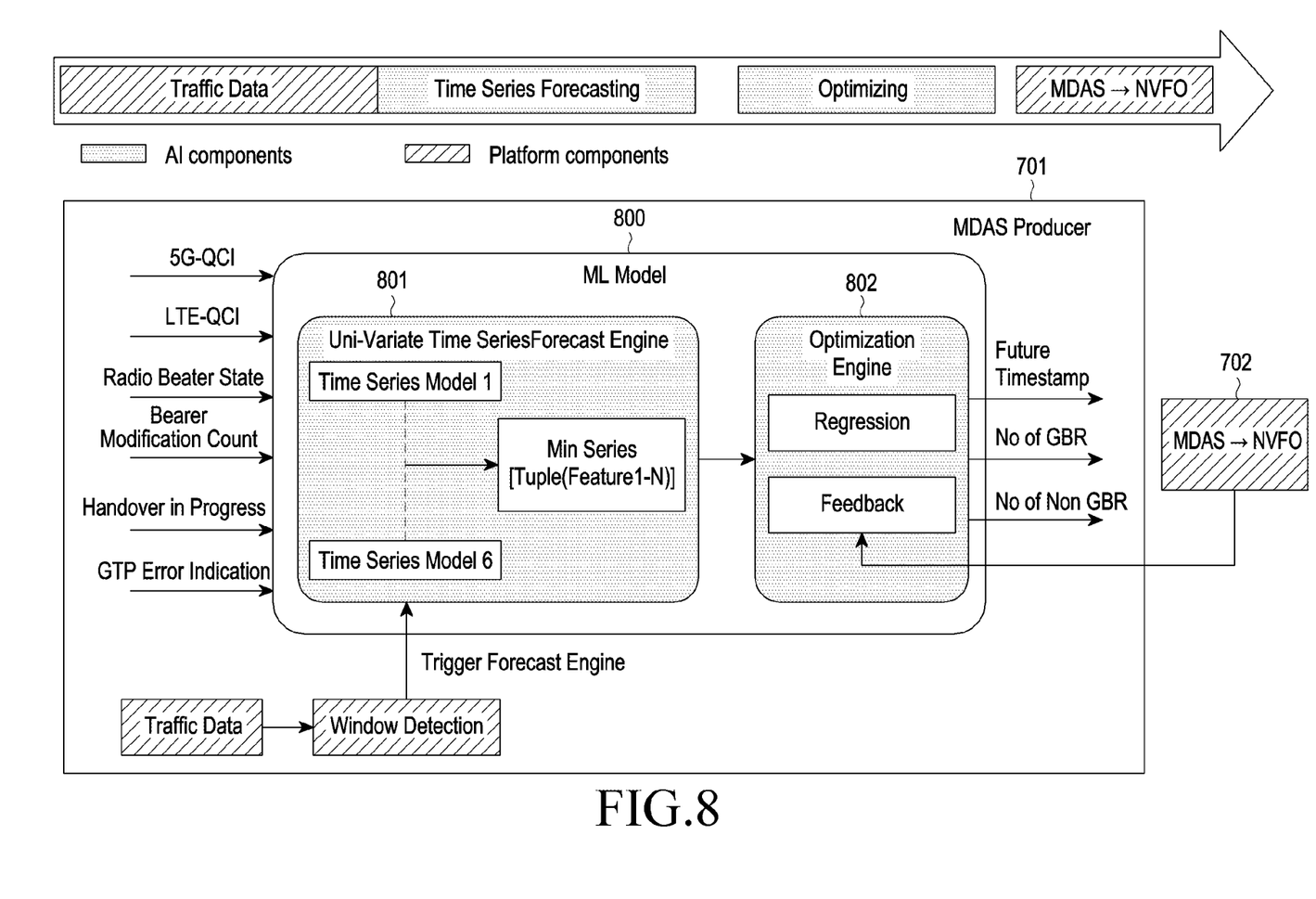
FIG. 8 depicts the components of an example machine learning (ML) model used for predicting a timestamp which is optimal for upgrading virtual network elements of a 5G virtual RAN, according to various example embodiments.

FIG. 8 depicts the components of an example ML model 800 used for predicting a timestamp which is optimal for upgrading virtual network elements of a 5G virtual RAN, according to embodiments as disclosed herein. The ML model 800 is a component in the MDAS producer 701 and is configured to generate the BIAR report. The ML model 800 allows integrating the generated BIAR report with the MDAS consumer 702, e.g., NFV MANO. The ML model 800 can enable in-service software upgrade of the virtual network elements 703 in the 5G virtual RAN. The ML model 800 allows automatic software upgrade of the virtual network elements 703 in the 5G virtual RAN at an optimal timestamp. The optimal timestamp is predicted by the ML model 800 and included in the BIAR.

The ML model 800 reduces potential hardships that can be experienced by a telecom network operator during the software upgrade of the virtual network elements 703. The accurate prediction of the optimal timestamp for upgrading the virtual network elements 703 in the 5G virtual RAN, and upgrading the software of the virtual network elements 703 at the predicted timestamp leads to a minimum or low impact of the software upgrade on user experience.

The ML model 800 comprises of a univariate time series forecast engine 801 and an optimization engine 802. The univariate time series forecast engine 801 and the optimization engine 802 are part of a trigger forecast engine. The ML model 800 performs data preprocessing and optimal time window detection. In an embodiment, the data comprises of information pertaining to the traffic conditions in the virtual network elements 703. The ML model 800 can collect the information pertaining to the traffic conditions in the virtual network elements 703 based on a plurality of input parameters (traffic parameters). The ML model 800 can generate the BIAR (which may include the optimal timestamp) based on the traffic parameters. The detected optimal time window is a time interval, within which the optimal timestamp, for triggering the software update of the network elements 703, lies.

In an embodiment, the traffic parameters comprises, but not limited to, 5G-QoS class identifier (5G-QCI), long term evolution (LTE)-QCI, radio bearer state, bearer modification count, handover in progress, general packet radio service (GPRS) tunnelling protocol (GTP) error indication, and so on. The univariate time series forecast engine 801 can include a plurality of time series models. The traffic parameters are provided to the univariate time series forecast engine 801. The number of time series models included in the univariate time series forecast engine 801 is based on the number of (input) traffic parameters fed to the univariate time series forecast engine 801. In an example, if six traffic parameters are fed to the univariate time series forecast engine 801, the univariate time series forecast engine 801 can include six time series models.

The univariate time series forecast engine 801 can assign weights to the traffic parameters at different timestamps. The value of the weights and the input parameters can influence the triggering of the software update of the network elements 703 at the different timestamps. In an embodiment, if the value of weight at a particular timestamp (current or future) is high, then the traffic parameter, with which the weight is associated, can hinder the triggering of the software update. On the other hand, if the value of weight at a particular timestamp is low, then the traffic parameter can facilitate the triggering of the software update.

The 5G-QCI indicates the type of resource bearers. The type of bearers can be guaranteed bit-rate (GBR) bearers, delay critical bearers, and non-GBR bearers. The univariate time series forecast engine 801 (time series model 1) can utilize the type to deduce the total number of active sessions at different timestamps within the optimal time window. Based on the number of active sessions, the time series model 1 can determine the weight that needs to be assigned to 5G-QCI at the different timestamps. The value of the weight at a particular timestamp is directly proportional to the number of active sessions. Therefore, when the number of active sessions is low, the 5G-QCI can facilitate the triggering of the software update. Similarly, when the number of active sessions is high, the 5G-QCI can prevent or reduce the triggering of the software update.

The LTE QCI indicates resource bearer types GBR and non-GBR. The time series model 2 of the univariate time series forecast engine 801 can utilize the type to deduce the total number of active LTE GBR sessions and active LTE non-GBR sessions at different timestamps within the optimal time window. Based on the number of active LTE sessions, time series model 2 can determine the weight that needs to be assigned to LTE-QCI at the different timestamps. The value of the weight associated with LTE-QCI at a particular timestamp is directly proportional to the number of active LTE GBR sessions and active LTE non-GBR sessions. However, the contribution of active LTE GBR sessions to the weight is greater than the contribution of active LTE non-GBR sessions. Therefore, when the number of active LTE GBR sessions and active LTE non-GBR sessions is low, the LTE-QCI can facilitate the triggering of the software update. Similarly, when the numbers of active LTE GBR sessions and active LTE non-GBR sessions are high, the LTE-QCI can prevent or reduce the triggering of the software update.

The radio bearer state indicates whether the radio bearer is in active state or in idle state. The radio bearer state is used for determining the status of bearer connection. The time series model 3 of the univariate time series forecast engine 801 can utilize the radio bearer state to deduce the total number of idle/active connections at different timestamps within the optimal time window. The time series model 3 can determine the weight that needs to be assigned to the radio bearer state based on the number of idle/active connections at the different timestamps. The value of the weight associated with radio bearer state at a particular timestamp is directly proportional to the number of active connections. Therefore, when the number of idle connections is high and the number of active connections is low, the radio bearer state can facilitate the triggering of the software update. Similarly, when the number of idle connections is low and the number of active connections is high, the radio bearer state can prevent or reduce the triggering of the software update.

The bearer modification count can indicate, for a particular bearer session, the number of times the bearer had undergone modifications since its creation. The time series model 4 of the univariate time series forecast engine 801 can utilize the bearer modification count to determine the frequency of modification undergone by each of the bearers at different timestamps within the optimal time window. The time series model 4 can determine the number of bearer sessions vulnerable to further bearer modifications at the different timestamps. The weight that needs to be assigned to the bearer modification count at a particular timestamp is based on the number of sessions vulnerable to further bearer modifications at the particular timestamp. The value of the weight associated with the bearer modification count is directly proportional to the number of sessions that are vulnerable to bearer modifications. Therefore, when the number of sessions vulnerable to bearer modifications is low, the bearer modification count facilitates the triggering of the software update. Similarly, when the number of sessions vulnerable to bearer modifications is high, the bearer modification count prevents or reduces the triggering of the software update.

The traffic parameter 'handover in progress' can indicate whether a particular bearer is undergoing handover. The time series model 5 of the univariate time series forecast engine 801 can utilize the 'handover in progress' to deduce number of bearer sessions which are undergoing handover at different timestamps within the optimal time window. The weight that needs to be assigned to the 'handover in progress' traffic parameter is based on number of sessions that are undergoing handover at the different timestamps. The value of the weight at a particular timestamp is directly proportional to the number of sessions that are undergoing handover at the particular timestamp. Therefore, when the number of sessions undergoing handover is low, the triggering of the software update is facilitated. Similarly, when the number of sessions undergoing handover is high, the triggering of the software update is prevented or reduced.

The GTP error indication allows determining whether a GTP path is in a state of error and is waiting for recovery. The time series model 6 of the univariate time series forecast engine 801 can utilize the GTP error indication to deduce number of bearer sessions that are recovering due to error in their respective GTP paths at different timestamps within the optimal time window. The weight that needs to be assigned to the GTP error indication is based on the number of sessions that are in the state of error at the different timestamps. The value of the weight associated with the GTP error indication at a particular timestamp is directly proportional to the number of sessions in the state of error at the particular timestamp. Therefore, when the number of sessions in the state of error is low, the GTP error indication facilitates the triggering of the software update. Similarly, when the number of sessions in the state of error is high, the GTP error indication prevents or reduces the triggering of the software update.

The univariate time series forecast engine 801 can compute the value of the following sum of products at each timestamp within the optimal time window:

(5G-QCI weight)*(5G-QCI)+(LTE-QCI weight)*(LTE-QCI)+(radio bearer state weight)*(radio bearer state)+(bearer modification count weight)*(Bearer Modification Count)+(Handover in progress weight)*(handover in progress)+(GTP error indication weight)*(GTP error indication).

The univariate time series forecast engine 801, for example, can determine the minimum value of sum of products and the timestamp corresponding to the minimum value of the sum of products, amongst all the sum of products corresponding to the different timestamps within the optimal time window. When the optimal time window comprises of future timestamps, then the minimum value of sum of products can be a predicted value, which corresponds to a future timestamp. The univariate time series forecast engine 801 can consider the timestamp with the minimum sum of products value or a low sum of products value, as an example, as the output 'future timestamp'. The future timestamp may be the optimal timestamp at which the software upgrade of the network elements 703 is to be triggered to ensure that the impact of the software upgrade on the user experience and service disruption is reduced or minimized.

The univariate time series forecast engine 801 can generate a BIAR comprising of the future timestamp, timestamp at which the BIAR is generated (reporting timestamp), an indication whether the reporting timestamp is optimal for triggering software upgrade of the virtual network elements 703, predicted number of active GBR DRBs at the future timestamp, predicted number of active non-GBR DRBs at the future timestamp, number of active GBR DRBs at the reporting timestamp, and predicted number of active non-GBR DRBs at the reporting timestamp. The univariate time series forecast engine 801 can deliver the BIAR to the MDAS consumer 702 (NFV MANO or NFVO).

Once the optimal timestamp for triggering the software upgrade of the network elements is predicted and provided to the, MDAS→NFVO 702, the NFVO 702 can provide a feedback to the optimization engine 802 regarding the optimality of the predicted future timestamp. The optimization engine 802 can validate whether the predicted future timestamp is optimal for triggering software upgrade based on the feedback received from the NFVO 702. If the predicted future timestamp is invalidated, the univariate time series forecast engine 801 can predict another optimal timestamp. On the other hand, if the predicted future timestamp is validated, the NFVO 702 can trigger the software upgrade.

If the number of non-GBR DRBs is greater than the number of GBR DRBs (as indicated in the BIAR), at a particular timestamp, by a factor or weightage, packet loss can be anticipated. This condition is optimal to assume delay-tolerance, which is also the optimal condition for the upgrade. Therefore, software upgrade can be triggered at the particular timestamp.

FIG. 8 shows exemplary units of the ML model 800, but it is to be understood that other embodiments are not limited thereon. In other embodiments, the ML model 800 may include less or more number of units. Further, the labels or names of the units of the ML model 800 are used only for illustrative purpose and does not limit the scope. One or more units can be combined together to perform same or substantially similar function in the ML model 800.

Figure 9:
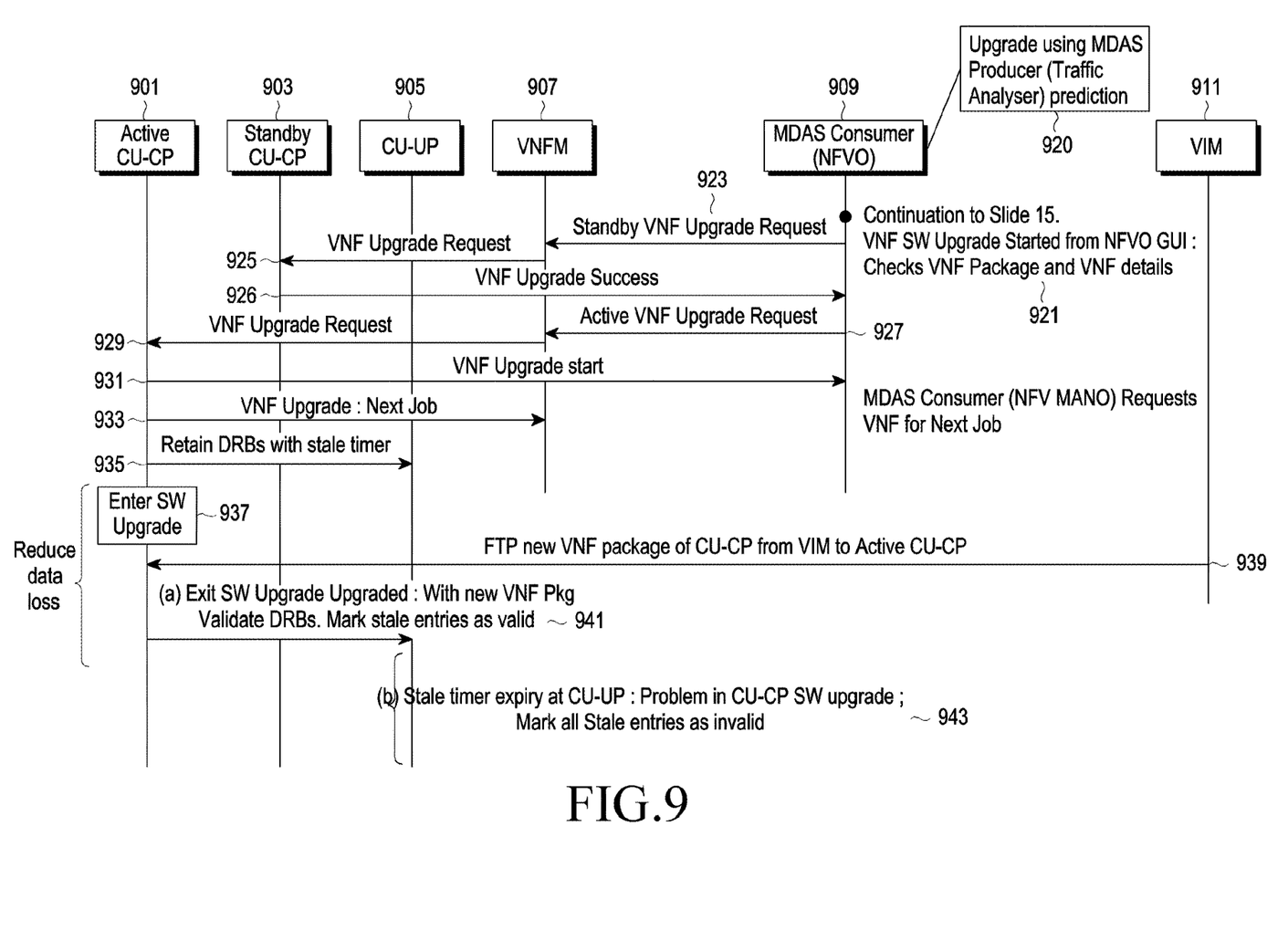
FIG. 9 is a sequence diagram depicting software upgrade of a CU-CP at a predicted optimal timestamp, according to embodiments as disclosed herein.

FIG. 9 is a sequence diagram depicting software upgrade of a CU-CP at a predicted optimal timestamp, according to embodiments as disclosed herein. The CU-CP is a virtual network element 703, which is a part of a gNB. The gNB is a part of a 5G virtual RAN. A NFVO (MDAS consumer 702) can request a traffic analyser (MDAS producer 701) to provide a timestamp, which is optimal for triggering software upgrade of the CU-CP within a time window. The triggering of software upgrade of the CU-CP at an optimal timestamp requires involves minimal operational cost in carrying out the software upgrade, prevents or reduces data loss due to the software upgrade, and has reduced or minimal impact of the software upgrade on the user experience. The traffic analyser can predict the optimal timestamp for triggering software upgrade of the CU-CP based on analysis of the traffic conditions at the CU-CP. The traffic analyser can analyse a plurality of traffic parameters pertaining to the traffic conditions at the CU-CP to predict the optimal timestamp.

As depicted in FIG. 9, an active CU-CP (901) and a standby CU-CP (903) needs to be upgraded. The active CU-CP (901) can be connected to the UEs through DRBs. The traffic analyser can generate a report relevant to the bearer conditions, which may include the predicted optimal timestamp. The traffic analyser can deliver the report to the NFVO (909) at step 920. The NFVO (909) can decide whether to trigger a software upgrade based on the report at step 921.

In an embodiment, if the NFVO (909) decides to trigger the software upgrade, the standby CU-CP (903) is upgraded first. If CU-CP network functionality software of the standby CU-CP (903) is upgraded successfully, the NFVO (909) triggers upgrading of CU-CP network functionality software of the active CU-CP. The NFVO graphical user interface (NFVO GUI) can check package details of the VNFs functioning as CU-CP prior to the initiation of the CU-CP network functionality software upgrade.

When the NFVO (909) triggers the software upgrade of the standby CU-CP, the NFVO (909) can send a VNF upgrade request to a VNFM (907) at step 923. The VNFM (907) can forward the VNF upgrade request to the standby CU-CP (903) at step 925. The standby CU-CP (903) can generate an upgrade order and track the upgrade order. And the standby CU-CP (903) can send VNF upgrade success to the NFVO (909) at step 926. The VIM (911) can send upgraded VNF packages, corresponding to the different components of the standby CU-CP (903), to the standby CU-CP (903) through file transfer protocol (FTP). This allows upgrading the standby CU-CP (903). Once the NFVO (909) verifies software upgrade of the standby CU-CP (903) is successfully completed, the software upgrade of the active CU-CP (901) can be initiated.

When the NFVO (909) triggers the software upgrade of the active CU-CP (901), the NFVO (909) can send a VNF upgrade request to a VNFM (907) at step 927. The VNFM (907) can forward the VNF upgrade request to the active CU-CP (901) at step 929. The active CU-CP (901) can inform the NFVO (909) and the VNFM (907) that the VNFs running on the VMs of the active CU-CP (901) are going to be upgraded at step 931 and 933. The active CU-CP (901) can request a CU-UP (905) to preserve (retain) the status of the bearers that are connecting UEs (user-end devices) to the CU-CP at step 935. The bearers are retained for a predefined recovery time interval. In an embodiment, the recovery time interval is defined based on negotiations between the active CU-CP (901) and the CU-UP (905) through radio resource configuration (RRC) messages. The retaining of the bearer status can significantly reduce signalling overhead involved in establishing radio bearers, which would be required if the UEs connect with another CU-CP. Therefore, retaining of the bearer status reduces the operational overhead involved in setting up of redundant CU-CP nodes while the active CU-CP (901) is undergoing software upgrade.

Thereafter, the active CU-CP (901) enters software upgrade mode at the predicted optimal time instant at step 937. It can be noted, that the recovery time interval begins when the active CU-CP (901) enters the software upgrade. The VIM (911) can send the new VNF packages to the active CU-CP through FTP at step 939, for the upgrading the different components of the active CU-CP.

When the active CU-CP (901) exits from the software upgrade mode with updated VNF package, the active CU-CP sends a RRC message to the CU-UP (905) at step 941. The RRC message indicates that the software update of the active CU-CP (901) is successful. The retained bearer entries are validated at the CU-CP with the aid of the UEs. On the other hand, if the active CU-CP does not become functional, e.g., if the CU-CP remains in the software upgrade mode after the predefined recovery time interval, the retained bearer entries are marked as invalid at step 943. In this instance, the software upgrade is not considered to be successful.

Figure 10:
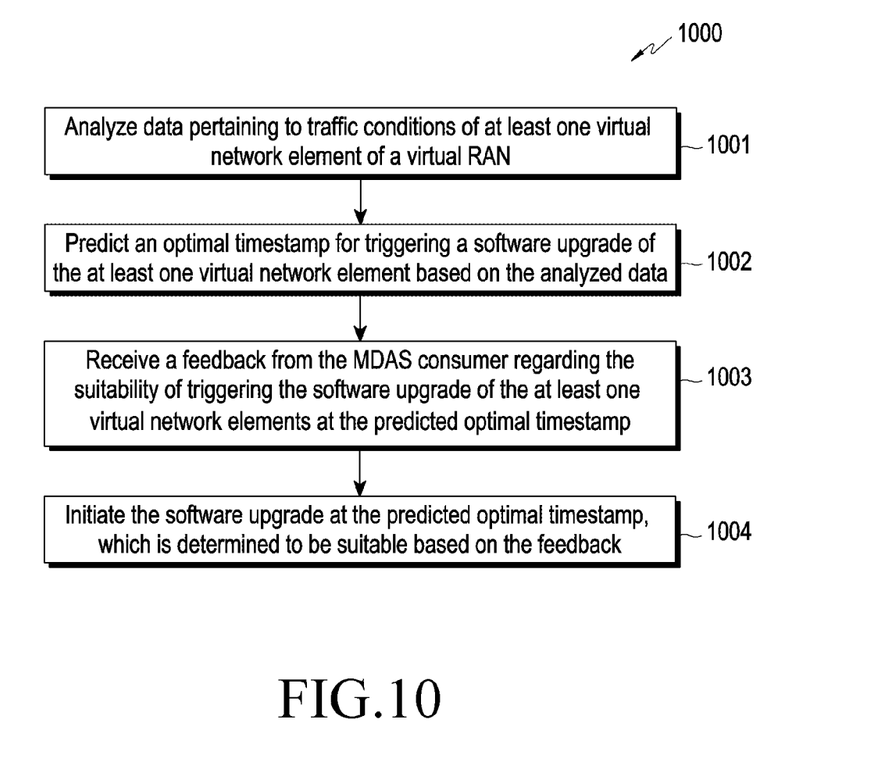
FIG. 10 is a flowchart depicting a method for upgrading the software of a virtual network element of a virtual RAN of a 5G network using management data analytics service (MDAS), according to various example embodiments.

FIG. 10 is a flowchart 1000 depicting a method for upgrading the software of a virtual network element of a virtual RAN of a 5G network using MDAS, according to embodiments as disclosed herein. At step 1001, the method may include analyzing, by a MDAS producer 701, data pertaining to traffic conditions of at least one virtual network element 703 of the virtual RAN. In an embodiment, the data may include traffic parameters such as, but not limited to, 5G-QCI, LTE QCI, radio bearer state, bearer modification count, handover in progress, GTP error indication, and so on. The MDAS producer 701 obtains the traffic parameters on receiving a request from a MDAS consumer 702 to provide a BIAR, which may include an optimal timestamp for triggering the software upgrade of the at least one virtual network element 703.

In an embodiment, the request can include the at least one virtual network element 703 (that needs to be upgraded) and an optimal time window. In an embodiment, the optimal timestamp for triggering the software upgrade of the at least one virtual network element 703 lies within the optimal time window.

At step 1002, the method may include predicting the optimal timestamp for triggering the software upgrade of the at least one virtual network element 703 based on the analyzed data. In an embodiment, the optimal timestamp is predicted, based on the traffic parameters, using time series forecasting using time series models. Each of the traffic parameters indicate a traffic condition and are associated with weights, which can influence the prediction of the optimal timestamp for triggering the software upgrade. The weights can vary based on the traffic parameters. For example, the 5G-QCI indicates the number of active sessions at different timestamps within the optimal time window. The weight associated with the 5G-QCI is directly proportional to the number of active sessions. When the number of active sessions is low, the triggering of the software update is facilitated. When the number of active sessions is high, the triggering of the software update is prevented or reduced.

As the traffic parameters are likely to vary at the different timestamps throughout the optimal time window, the weights associated with the traffic parameters are different at the different timestamps throughout the optimal time window. Example embodiments may include computing a sum of products of the traffic parameters and the associated weights at each of the different timestamps throughout the optimal time window. The timestamp at which the sum of products is minimum is an example optimal timestamp for triggering the software upgrade of the at least one virtual network element 703 within the optimal time window.

Example embodiments may include generating a BIAR, which may include the optimal timestamp, timestamp at which the BIAR is generated (reporting timestamp), an indication whether the reporting timestamp is optimal for triggering software upgrade of the at least one virtual network elements 703, number of active GBR DRBs at the optimal timestamp, and number of active non-GBR DRBs at the optimal timestamp. Example embodiments may include delivering the BIAR to the MDAS consumer 702.

At step 1003, the method may include receiving a feedback from the MDAS consumer 702 regarding the suitability of triggering the software upgrade of the at least one virtual network elements 703 at the predicted optimal timestamp. In an embodiment, the MDAS consumer 702 can send the feedback to the MDAS producer 701. The MDAS producer 701 can validate whether the predicted optimal timestamp is suitable for triggering the software upgrade based on the feedback. If the predicted future timestamp is invalidated, Example embodiments may include predicting another optimal timestamp for triggering the software upgrade. This can improve the accuracy of prediction of the optimal timestamp.

In an embodiment, conditions which are suitable for triggering the software upgrade are, but not limited to, when number of active bearer sessions is low, when only default bearer sessions are active, when number of bearer modifications undergone by the active GBR/Critical GBR sessions is less, when most of the bearer sessions are not in active state, when handover is not in progress for most of the active bearers sessions, when most of the active bearers sessions are not in GTP error indication state, and so on.

At step 1004, the method may include initiating the software upgrade at the predicted optimal timestamp, which is determined to be suitable based on the feedback. The MDAS consumer 702 can send a VNF upgrade request to a VNFM, which is responsible for management of the networking functions, e.g., VNF, running on the VMs representing the at least one virtual network element 703. The VNFM can forward the VNF upgrade request to the at least one virtual network element 703. "Based on" as used herein covered based at least on.

The at least one virtual network element 703 can retain the status of the bearers that are connecting at least one UE to the at least one virtual network element 703. Example embodiments may include retaining the bearers for a predefined recovery time interval. The at least one virtual network element 703 enters software upgrade mode at the predicted optimal time instant. The at least one virtual network element 703 is loaded with new VNF packages during the software upgrade. Example embodiments may include validating the retained bearer entries after a successful software upgrade. If the software upgrade is not completed within the predefined recovery time interval, the retained bearer entries are released.

The various actions in the flowchart 1000 may be performed in the order presented, in a different order, or simultaneously. Further, in some embodiments, some actions listed in FIG. 10 may be omitted.

The embodiments disclosed herein can be implemented through at least one software program running on at least one hardware device and performing network management functions to control the network elements. The network elements shown in FIG. 7 include blocks which can be at least one of a hardware device, or a combination of hardware device and software module. Each "module" herein may comprise circuitry.

The embodiments disclosed herein describe methods and apparatuses for providing a ML model for predicting an optimal timestamp for upgrading the software of virtual network elements of a 5G network based on analysis of parameters pertaining to the traffic conditions of the virtual network elements of the 5G network. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in example Very high speed integrated circuit hardware description language (VHDL), or any other programming language, or implemented by one or more VHDL or several software modules being executed on at least one hardware device. The hardware device can be any kind of portable device that can be programmed. The device may also include means, which could be, for example, a hardware means, for example, an application-specific integrated circuit (ASIC), or a combination of hardware and software means, for example, an ASIC and a field programmable gate array (FPGA), or at least one microprocessor and at least one memory with software modules located therein. The method embodiments described herein could be implemented partly in hardware and partly in software. Alternatively, various example embodiments may be implemented on different hardware devices, e.g. using a plurality of central processing units (CPUs). Each CPU and each "processor" herein comprises circuitry.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclo-

What is claimed is:

1. A method for managing a software upgrade of a network element of a radio access network (RAN) by a management data analytics service (MDAS) producer, wherein the network element is connected to a user equipment (UE) through a dedicated radio bearer (DRB) to provide a communication service to the UE, the method comprising:
- receiving a request related to a time for the software upgrade of the network element in the RAN, from a MDAS consumer;
- identifying information related to the DRB;
- identifying information related to the time for the software upgrade of the network element based on the information related to the DRB; and
- transmitting a report including the information related to the time for the software upgrade of the network element,
- wherein the information related to the time for the software upgrade of the network element includes at least one of a number of guaranteed bit-rate (GBR) DRBs at the time or a number of non-GBR DRBs at the time.

2. The method of claim 1, wherein the request received from the MDAS consumer includes information indicating the network element and a predetermined time window in which the time is included.

3. The method of claim 1, wherein the information related to the DRB comprises at least one of radio bearer state, or bearer modification count related to the DRB.

4. The method of claim 1, wherein the information related to the time for the software upgrade of the network element further includes the time for the software upgrade of the network element.

5. The method of claim 1, wherein further comprising optimizing the time at least by collaborating with the MDAS consumer, wherein the collaboration involves the MDAS consumer providing a feedback to the MDAS producer regarding optimality of the time for the software upgrade of the network element at the time.

6. The method of claim 5, further comprising re-identifying information related to the time based on the feedback indicating that the time is not optimal for the software upgrade of the network element.

7. An electronic device of a management data analytics service (MDAS) producer for managing a software upgrade of a network element of a radio access network (RAN), wherein the network element is connected to a user equipment (UE) through a dedicated radio bearer (DRB) to provide a communication service to the UE, the electronic device comprising:
- at least one processor comprising processing circuitry; and
- a memory storing instructions which, when executed individually and/or collectively by the at least one processor, controls the electronic device to:
- receive a request related to a time for the software upgrade of the network element in the RAN;
- identify information related to the DRB;
- identify information related to the time for the software upgrade of the network element based on the information related to the DRB; and
- transmit a report including the information related to the time for the software upgrade of the network element,
- wherein the information related to the time for the software upgrade of the network element includes at least one of a number of guaranteed bit-rate (GBR) DRBs at the time or a number of non-GBR DRBs at the time.

8. The electronic device of claim 7, wherein the request received from the MDAS consumer includes information indicating the network element and a predetermined time window in which the time is included.

9. The electronic device of claim 7, wherein the information related to the DRB comprises at least one of radio bearer state, or bearer modification count related to the DRB.

10. The electronic device of claim 7, wherein the information related to the time for the software upgrade of the network element further includes the time for the software upgrade of the network element.

11. The electronic device of claim 7, wherein the memory stores instructions which, when executed individually and/or collectively by the at least one processor, controls the electronic device to optimize the time at least by collaborating with the MDAS consumer, wherein the collaboration involves the MDAS consumer providing a feedback to the MDAS producer regarding optimality of the time for the software upgrade of the network element at the time.

12. The electronic device of claim 11, wherein the memory stores instructions which, when executed individually and/or collectively by the at least one processor, controls the electronic device to re-identify the information related to the time based on the feedback indicating that the time is not optimal for the software upgrade of the network element.

13. A non-transitory computer readable storage medium storing program code which, when executed by at least one processor of an electronic device of (MDAS) producer for managing a software upgrade of a network element of a radio access network (RAN), causes the electronic device to perform operations, wherein the network element is connected to a user equipment (UE) through a dedicated radio bearer (DRB) to provide a communication service to the UE, the operations comprising:
- receiving a request related to a time for the software upgrade of the network element in the RAN;
- identifying information related to the DRB;
- identifying information related to the time for the software upgrade of the network element based on the information related to the DRB; and
- transmitting a report including the information related to the time for the software upgrade of the network element,
- wherein the information related to the time for the software upgrade of the network element includes at least one of a number of guaranteed bit-rate (GBR) DRBs at the time or a number of non-GBR DRBs at the time.

14. The non-transitory computer readable storage medium of claim 13, wherein the request received from the MDAS consumer includes information indicating the network element and a predetermined time window in which the time is included.

15. The non-transitory computer readable storage medium of claim 13, wherein the information related to the DRB comprises at least one of radio bearer state, or bearer modification count related to the DRB.

16. The non-transitory computer readable storage medium of claim 13, wherein the information related to the time for the software upgrade of the network element further includes the time for the software upgrade of the network element.

17. The non-transitory computer readable storage medium of claim 13, wherein the operations further comprises optimizing the time at least by collaborating with the MDAS consumer, wherein the collaboration involves the MDAS consumer providing a feedback to the MDAS producer regarding optimality of the time for the software upgrade of the network element at the time.

18. The non-transitory computer readable storage medium of claim 17, wherein the operations further comprises re-identifying the information related to the time based on the feedback indicating that the time is not optimal for the software upgrade of the network element.

19. The method of claim 1, wherein the information related to the DRB comprises handover in progress information for the DRB.

20. The electronic device of claim 7, wherein the information related to the DRB comprises handover in progress information for the DRB.

* * * * *